United States Patent [19]

Spivak

[11] Patent Number: 5,594,293
[45] Date of Patent: Jan. 14, 1997

[54] ELECTROACOUSTIC ENERGY CONVERTER FOR TRANSFORMATION BETWEEN THERMAL AND ELECTRICAL ENERGY

[75] Inventor: Victor Spivak, Haifa, Israel

[73] Assignee: Igor Gorlitsky, Kiriat Motzkin, Israel

[21] Appl. No.: 474,153

[22] Filed: Jun. 7, 1995

Related U.S. Application Data

[63] Continuation-in-part of Ser. No. 2,907, Jan. 11, 1993.

[30] Foreign Application Priority Data

Jan. 14, 1992 [IL] Israel ......................................... 100648

[51] Int. Cl.⁶ .................................................... H01L 41/08
[52] U.S. Cl. ............................ 310/339; 310/322; 310/331
[58] Field of Search ....................................... 310/311, 322, 310/323, 328, 338, 339, 330–332, 321; 322/2 R

[56] References Cited

U.S. PATENT DOCUMENTS

| | | | |
|---|---|---|---|
| 2,509,913 | 5/1950 | Espenschied | 310/322 |
| 2,531,230 | 11/1950 | Mason | 310/321 |
| 3,198,969 | 8/1965 | Kolm et al. | 310/339 |
| 3,354,327 | 11/1967 | Benson | 310/339 |
| 4,467,236 | 8/1984 | Kolm et al. | 310/321 |
| 4,510,935 | 4/1985 | Spencer | 128/419 D |
| 5,223,763 | 6/1993 | Chang | 310/339 |

Primary Examiner—Mark O. Budd
Attorney, Agent, or Firm—Wigman, Cohen, Leitner & Myers, P.C.

[57] ABSTRACT

Electroacoustic converter for transformation between thermal and electrical energy, comprising working chamber filled with working medium, piezoelectric transducer, acoustic filter and source of gaseous substance to be supplied into working chamber under pressure.

Combustion of gaseous substance causes its pulsation accompanied by emitting acoustic waves, which being transmitted via working medium to said transducer are converted into electrical signals. The signals can be released from the electrical terminals of transducer.

The same device can function in opposite direction in the sense that it converts the supplied to transducer electrical energy into acoustical waves which being emitted by the transducer are transferred through the working medium to the gaseous stream.

This process is accompanied by adiabatic heating and cooling of the stream and thus transferring of electrical energy into heat energy takes place while converter operates as a heat machine.

21 Claims, 4 Drawing Sheets

ELECTROACOUSTIC ENERGY CONVERTER FOR TRANSFORMATION BETWEEN THERMAL AND ELECTRICAL ENERGY

This application is a continuation-in-part of application Ser. No. 08/002,907 filed Jan. 11, 1993.

FIELD OF THE INVENTION

The present invention relates to the field of conversion of the heat energy into electrical energy and/or vice versa based on the use of the piezoelectric transducer which, being compressed by the external force (for example due to the explosion of a fuel mixture in the combustion chamber of the engine), causes a voltage, or being exposed to the external alternating electrical field produces acoustical waves, which can be utilized, for example, in the compression refrigeration cycle for producing cold.

BACKGROUND OF THE INVENTION

Utilization of the piezoelectric effect in different devices is known, and one can mention very different applications in which these devices are presently effectively used, including process control, nondestructive testing, intrusion detection, measurement of elastic properties, medical diagnosis, delay lines, and signal processing, etc.

These and many other applications of the piezoelectric effect are well described in the literature and can be found, for example, in the monograph, "Ultrasonics, Fundamentals, Technology, Applications," by Dale Ensminger, Marcel Dekker, Inc., 1988.

The most important part of such devices is the piezoelectric transducer, containing crystalline material, which, being exposed to a pressure applied along certain crystallographical axes, is able to produce electrical charges on preferred crystallographic surfaces, or, on the contrary, being exposed to a voltage applied between two preferred surfaces of the crystal, is able to produce a stress or strain along its axes.

Depending on the amount of electrical energy convened into mechanical energy of acoustical waves or vice versa, a particular transducer can be used in devices for low- or high-intensity applications.

Low-intensity applications are usually those wherein the primary purpose is to transmit the converted energy as acoustic waves through a medium without changing its state and to measure the propagation characteristics for obtaining engineering data for materials.

Devices based on piezoelectric transducers which operate on low-intensity principles include, for example, height detectors, liquid-level gauges, devices for measuring of amount of solids in suspension, and so on.

High intensity applications are those which produce changes in or effect the medium, or the contents of the medium, through which the converted energy propagates.

There are various mechanisms which promote this effect. Some of them can be related to heat, chemical effect, cavitation, mechanical effects, etc.

High-intensity applications of piezoelectric transducers are numerous, and for only a few examples of leading commercial high-intensity applications one can mention ultrasonic cleaning tanks, ultrasonic machining tools, ultrasonic welders, atomizers for oil burners, dewatering devices, and so on.

In all the above mentioned applications there takes place conversion of the electric energy into mechanical energy of acoustical waves or vice versa, not for the purpose of generating energy, but for achieving a particular mechanical, chemical or other effect, in other words, these devices do not serve as energy generators, per se.

There are also publications in which there is mention of the utilization of piezoelectric transducers in generators, for example, those driven by combustion engines, (see U.S. Pat. No. 4,511,818). This known device comprises a combustion engine which has piston driven by explosion of a fuel mixture and a piezoelectric transducer responsible for generating voltage and applying this voltage for return piston movement.

Despite the fact that this device includes piezoelectric transducer and combustion engine, it cannot be considered a piezoelectric generator of energy per se, since that the voltage generated in the transducer serves not for energy output, but for an auxiliary purpose; namely, for the return movement of a second piston of the combustion engine.

Another device, known in the art as V. M. Falkov's generator and described in the Soviet invention certificate, SU 613,421, is dedicated to converting the energy of flowing gas into electric energy.

This generator uses piezoelectric elements to generate an electric signal when the elements are exposed to a flow of gas or steam entering the case where these elements are mounted. The case with piezoelectric elements is installed in the vehicle, and when it moves on a road or in the air, gas or steams cause deformation and oscillation of the piezoelectric elements thus generating an electric signal collected by current collectors.

The main disadvantage of this and other known generators comprising combustion chambers and utilizing the piezoelectric effect for converting of mechanical or heat energy into electric energy (or vice versa) is their low efficiency, i.e., low value of the ratio of the power out to the total power into the system.

This disadvantage is intrinsic to generators in which the transfer of acoustic energy takes place inside the combustion chamber and is associated with the fact that it is very difficult to ensure both high efficiency of transformation of heat energy from the exploding fuel into acoustic energy (in the combustion chamber) and at the same time high efficiency of transformation of acoustic energy into electric energy (in the transducer). To ensure both of the above conditions, the combustion chamber should be as small as possible; however, this condition makes difficult effective thermal insulation and reliable functioning of the transducer. Besides, a small combustion chamber requires more frequent cleaning because it becomes dirty more often.

As a consequence, there should always be a compromise between the ultimate dimensions of the chamber while still ensuring its reliable functioning and achievable efficiency of the generator.

SUMMARY OF THE INVENTION

The object of the present invention is to provide an electroacoustic energy converter for converting heat energy into electrical energy and/or vice versa in which the above mentioned disadvantages are reduced or eliminated.

In particular, the first object of the present invention is to provide an electroacoustic energy converter with improved efficiency of the power transfer between the source of heat energy and piezoelectric transducer.

The second object of the present invention is to provide a compact and reliable electroacoustic energy converter without reducing its efficiency in terms of the ratio of the power out to the total power into the system.

The third object of the present invention is to provide an electroacoustic energy converter in which wasteful dissipation of acoustic energy transmitted between the source of the heat energy and piezoelectric transducer is eliminated.

Yet another object of the present invention is to provide an electroacoustic energy converter in which transmitting of the acoustic energy from the transducer is accompanied by periodical adiabatic heating and cooling which can be used in the compression refrigeration cycle for producing cold.

The above mentioned objects of the present invention can be achieved in accordance with the following combination of its main features:

i) an assembly which provides a working chamber filled with a working medium;

ii) at least one electroacoustic transducer, provided with electric terminal, whereas said transducer being exposed to electric voltage applied to said terminal is able to emit acoustic waves transmitted to said working chamber or being exposed to acoustic waves transmitted from said working chamber is able to convert them into electrical energy to be released as an electrical signal from the electric terminal;

iii) at least one pair of oppositely disposed acoustical filters communicating with said working chamber, whereas the first of said filters is provided with the inlet nozzle and the second filter is provided with the outlet nozzle;

iv) connected with said assembly, the source of gaseous substance to be supplied under pressure into said working chamber via said inlet nozzle of said first filter in order to obtain a stream, directed from said first filter to said second filter, whereas said stream is able to pulsate while emitting acoustic waves transmitted to said transducer via said working medium, or receive acoustic waves transmitted via said working medium from said transducer is acoustically connected with said working medium, consisting of a substance with mechanical properties satisfying the following relationship:

$$\delta V \geq V(A-1)/(A+1)$$

where:
A—is the required rate of compression of the gaseous substance in said pulsating stream,
V—is a mean volume of said pulsating stream, included between said filters; and
$\delta V$—is the ultimate volume change of said pulsating stream without destruction of its continuity.

According to one of the preferred embodiments of the present invention at least one of the filters is electrically connected with the source of the voltage and the working medium consists of a fluid substance, for example, liquid and/or jelly substance and the assembly is provided with the outside source of the fluid substance to be supplied under pressure into the working chamber; and the gaseous substance mainly consists of fuel and/or oxidizer, for example, a mixture of gasoline vapor with air.

According to one of the other preferred embodiments of the present invention, the transducer is carried out as a ring, the interior of which provides a cylindrical space for the working chamber;

said filters are carried out as funnel-like elements, the apexes of which are disposed vis-a-vis along the longitudinal axis of said working chamber, said acoustic filters are carried out as hollow elements provided with at least one perforated plate installed inside their interior dividing them into communicating compartments adapted to filter and eliminate unuseful dissipation of acoustic waves transmitted via said pulsating stream;

the apex of said first filter is provided with a calibrated orifice adapted to intake the gaseous substance supplied to said working chamber for creating said stream pulsating inside of the working medium, the apex of one of the said filters is carried out as a conical tip electrically insulated from the rest of this filter and said conical tip is electrically connected with said source of voltage, and the apex of the second of the said filters is provided with an opening communicating with said working chamber and adapted to intake said pulsating stream.

According to still another embodiment of the present invention it can be provided with a distribution means installed inside said working chamber and adapted to direct said working medium supplied into said working chamber symmetrically, with respect to the longitudinal axis of said working chamber, and said distribution means is carried out as a ring installed around said first filter so as to provide a circular gap between said ring and the outside conical surface of said first filter.

Another object of the present invention is achieved in accordance with another embodiment in which said working medium consists of a fluid substance, mainly silicone rubber and is provided with at least one channel for passing of said pulsating stream from said first filter to said second filter, whereas said acoustic waves emitted from said transducer cause periodical compression and expansion of said stream passing via said channel, and thus its periodical adiabatic heating and cooling and said second filter is provided with at least one additional outlet nozzle and with at least one valve adapted to allow periodical passage of said heated or cooled stream, respectively, via one of said outlet nozzles.

Another object of the present invention can be achieved in accordance with the following combination of features:

i) an assembly which provides a working chamber filled with a working medium ii) at least one electroacoustic transducer, provided with electric terminal, whereas said transducer being exposed to electric voltage applied to said terminal is able to emit acoustic waves transmitted to said working chamber or being exposed to acoustic waves transmitted from said working chamber is able to convert them into electrical energy to be released as an electrical signal from the electric terminal, wherein said transducer is a ring in which the inner surface provides a cylindrical space for said working medium;

iii) at least one pair of oppositely disposed acoustical filters communicating with said working chamber, whereas the first of said filters is provided with the inlet nozzle and the second filter is provided with the outlet nozzle, and said filters are carried out as narrow chambers, the apexes of which are disposed vis-a-vis along the longitudinal axis of said working chamber, and the apex of one of the said filters is a conical tip electrically connected with said source of voltage, and the apex of the second of said filters is provided with an opening communicating with said working chamber and adapted to pass said pulsating stream;

iv) connected with said assembly, the source of gaseous substance to be supplied under pressure into said working chamber via said inlet nozzle of said first filter in order to obtain a stream, directed from said first filter to said second filter, whereas said stream is able to pulsate while emitting acoustic waves transmitted to said transducer via said working medium, or receive acoustic waves transmitted via said working medium from said transducer,
wherein said transducer is acoustically connected with said working medium consisting of a substance with mechanical properties satisfying the following relationship:

$$\delta V \geq V(A-1)/(A+1)$$

where:
A—is the required rate of compression of the gaseous substance in said pulsating stream,
V—is a mean volume of said pulsating stream, included between said filters; and
δV—is the ultimate volume change of said pulsating stream without destruction of its continuity.

Another object of the present invention can be achieved in accordance with the following combination of features:

i) an assembly which provides a working chamber filled with a working medium;

ii) at least one electroacoustic transducer, provided with electric terminal, whereas said transducer being exposed to electric voltage applied to said terminal is able to emit acoustic waves transmitted to said working chamber or being exposed to acoustic waves transmitted from said working chamber is able to convert them into electrical energy to be released as an electrical signal from the electric terminal;

iii) at least one pair of oppositely disposed acoustical filters communicating with said working chamber, whereas the first of said filters is provided with the inlet nozzle and the second filter is provided with the outlet nozzle;

iv) connected with said assembly, the source of gaseous substance to be supplied under pressure into said working chamber via said inlet nozzle of said first filter in order to obtain a stream, directed from said first filter to said second filter, whereas said stream is able to pulsate while emitting acoustic waves transmitted to said transducer via said working medium, or receive acoustic waves transmitted via said working medium from said transducer, whereas said transducer is acoustically connected with said working chamber and said working chamber is filled with the working medium consisting of a substance with mechanical properties satisfying the following relationship:

$$\delta V \geq V(A-1)/(A+1)$$

where:
A—is the required rate of compression of the gaseous substance in said pulsating stream,
V—is a mean volume of said pulsating stream, included between said filters; and
δV— is the ultimate volume change of said pulsating stream without destruction;

wherein said transducer comprises a first ring and a second ring coaxially disposed inside said first ring in which the second ring includes an inner surface which provides a cylindrical space for said working medium, and said filters are disposed within said cylindrical space.

BRIEF DESCRIPTION OF THE DRAWING FIGURES

For better understanding of its objects and advantages as well its functioning, reference should now be made to the following description in combination with the accompanying drawings.

FIG. 7b is a partial section of FIG. 7a.

DESCRIPTION OF THE PREFERRED EMBODIMENTS

Figure 1:
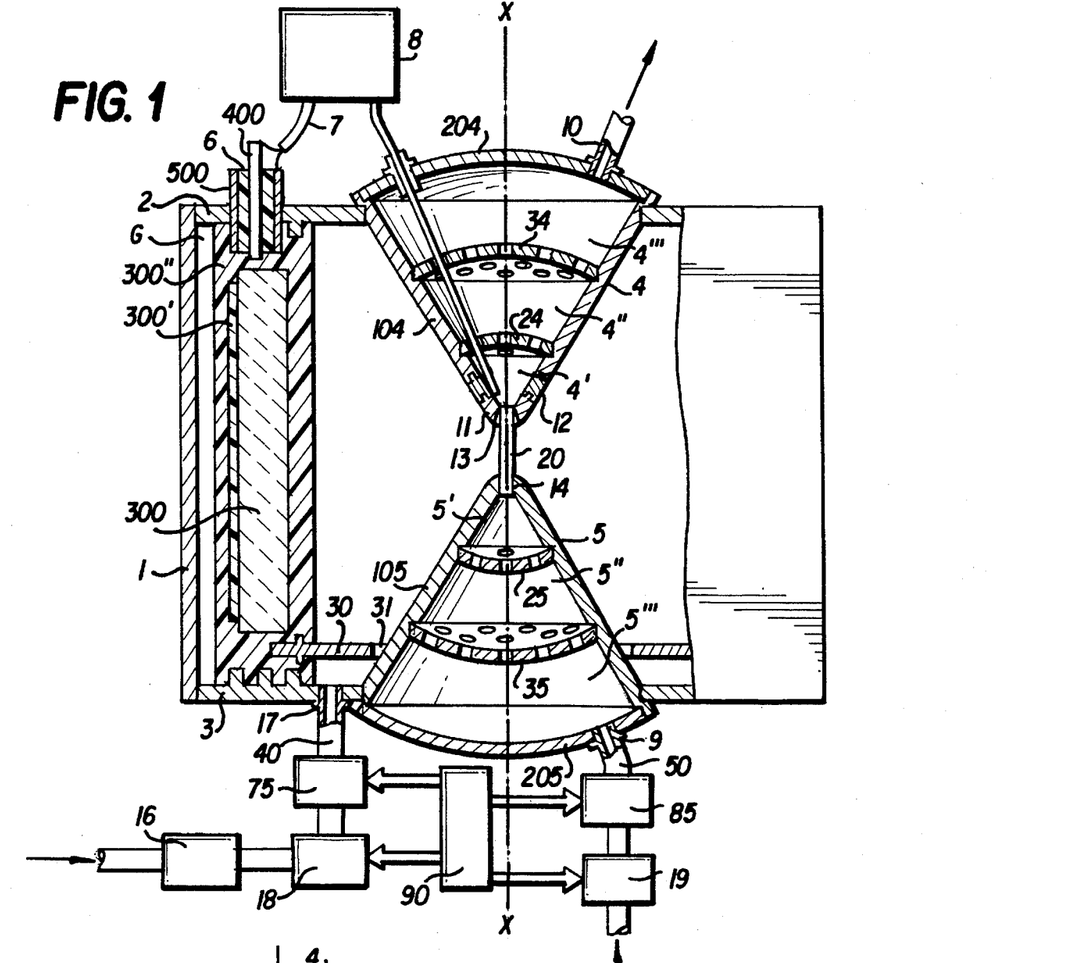
FIG. 1 is a schematic view of the electroacoustic energy converter in accordance with the first embodiment of the present invention, which serves as a generator of electrical energy piezoelectrically converted from the heat energy produced by explosion of the fuel mixture in a combustion chamber of the internal combustion engine.

With reference to FIG. 1, according to the first embodiment of the present invention, the electroacoustic energy converter is carried out as an assembly providing a cylindrical working chamber 1, closed from two sides by upper cover 2 and lower cover 3.

The working chamber presented in FIG. 1, is shown as a cylinder closed by the covers; however, it should be understood that the assembly may have another shape and be carried out like an open chamber as well.

The converter assembly comprises as its main components a ring-like piezoelectric transducer 300, and the two oppositely disposed elements 4, 5.

Transducer 300 is made of piezoelectric ceramic material, which is known per se as $PbTiZrO_3$, and has a ring-like shape corresponding to the inner cylindrical surface of the working chamber.

Transducer 300 is wrapped in the glass fiber reinforcing layer 300', and is sealed inside insulating sleeve 300", which is made of appropriate elastic polymer. The outside diameter of the insulating sleeve is less than the inside diameter of the working chamber so that there is a gap, G, between its inner surface and the sleeve 300". The inner cylindrical surface of the ring-like transducer is acoustically connected with the interior of the working chamber 1.

Transducer 300 is connected with electrodes 400, 500 installed in the upper cover 2. These electrodes, as well as separating the insulating ring 6 between them, present an electric terminal which in principle can be used both for release of the electrical signal generated by the transducer, or for supply of the outside voltage to the transducer.

The first situation relates to operation of the converter as a generator of electrical energy converted from acoustical energy and released from the terminal via electrical contact 7 and collected in the outside collector 8. The embodiment presented in FIG. 1 relates just to this mode of operation and will be further explained in more detail.

In the second case, the electrical energy supplied from the outside source via electrical terminal to the transducer is converted into acoustical energy and then into heat energy. This mode of operation relates to an embodiment of the converter as presented in FIG. 2.

In accordance with the embodiment presented in FIG. 1, the elements 4, 5 are carried out as two hollow funnels each limited by the conical surface 104, 105 and arched base 204, 205. The significance of this particular construction will be explained further. These elements are mounted on the upper cover and lower cover, respectively, and are oriented in such a manner that their apexes are directed vis-a-vis inside the chamber, while their bases are directed in the opposite sense.

The lower element 5 mounted on the lower cover 3 is provided with the inlet nozzle 9, while the upper element 4 mounted on the upper cover 2 is provided with the outlet nozzle 10. The apex of the upper element 4 is provided with the conical tip 11, separated from the rest of this element by the insulating ring, 12.

A small opening 13 is provided in the conical tip so that the inner hollow part of this element communicates with the interior of the working chamber via this opening.

The apex of the lower element 5 is provided with a calibrated orifice 14 and the inner hollow part of this element communicates with the interior of the working chamber as well.

Both the opening 13 and calibrated orifice 14 are disposed oppositely along the central longitudinal axis X—X of the cylindrical assembly.

The purpose of the nozzles as well of the opening 13 and orifice 14 will be understood from the following description.

The principle of conversion of the heat energy in the generator in accordance with the embodiment shown in FIG. 1 will now be explained.

The inner part of the working chamber, limited by the ring-like transducer 300, is filled with the medium, which conducts acoustic waves and participates in combustion. Combustion of a gaseous substance (consisting of fuel and/or oxidizer) supplied into the working chamber together with the working medium is used in order to initiate propagation of acoustic waves through the medium therein. This mixture, being periodically ignited, creates a stream pulsating with the frequency of ignition and thus emitting acoustic waves. These waves are transmitted via the working medium towards the transducer and when their frequency corresponds to the resonant frequency of the transducer they are efficiently converted into electrical signals, which can be obtained from the electric terminal.

In other words, production of acoustical energy from the heat energy and then conversion of acoustical energy into electrical energy takes place.

According to the above principle of operation, the working chamber in fact serves as a combustion chamber, in which the fuel mixture being ignited explodes and burns, thus producing heat energy.

The working medium is supplied into the working chamber from the vessel 16 via the pipe 40 connected with the opening 17 in the working chamber. The medium consists of a fluid substance and should be supplied into the working chamber under certain pressure in order to compensate for its consumption during combustion. The term "fluid" should be understood as referring to material capable of flowing to conform to the outline of its container and in this sense the physical state of the fluid substance to be used as a working medium can be both liquid and jelly or their mixture. Jelly gasoline is an example of such a substance.

A hydraulic or mechanical pump 18 is installed between the source of the working medium and the opening 17 in order to keep and maintain the pressure of the fluid working medium.

To ensure proper combustion and establishment of a pulsating stream, a supply of a gaseous substance consisting of fuel, of oxidizer or their mixture is provided. The physical state of the gaseous substance can be gas, vapor, aerosol, or their mixture.

The gaseous mixture may be a mixture of gasoline vapour with air, for example. An example of the gaseous fuel includes hydrogen. An example of the gaseous oxidizer includes air. There is a possibility that the working medium consists of fuel while the gaseous substance is air. The gaseous substance is supplied under pressure into the inlet nozzle 9 of the lower element 5 from the outside source 19 via the pipeline 50.

The gaseous substance exits from the orifice 14 and creates a stream directed along the longitudinal axis X—X of the chamber towards the opening 13 of the upper element 5.

The upper element is electrically connected with the outside source of alternating voltage, applied to the conical tip 11 for ignition of the stream in vicinity of the opening 13.

As the source of voltage, one can use the same collector 8 mentioned above in connection with the release of electrical energy from the transducer terminal.

Ignition of the stream causes its combustion, heating, and therefore increase of pressure of the gaseous substance. This process in turn is accompanied by the increase in volume of the stream and by its expansion.

Expansion of the gaseous substance causes emission of the elastic acoustic wave, propagating from the stream towards the transducer via working medium.

After expansion of the stream up to certain maximum, combustion terminates and the diameter of the stream diminishes to a certain minimum.

The alternating voltage being supplied to the upper element will cause periodic ignition and combustion of the stream and thus its pulsation, accompanied by the emission of acoustic waves. The frequency of these waves will correspond to the frequency of the ignition voltage; by controlling application of the ignition voltage one can ensure that this frequency will correspond to the resonant frequency of the transducer. During pulsation the volume of the stream is equal to the mean value between its maximum in the expanded state and its minimum in the compressed state.

Combustion products accumulated during burning and intake through the opening 13 can be evacuated from the upper element via the outlet nozzle 10.

The inner parts of both hollow elements 4, 5 are divided into communicating compartments, 4', 4", 4''' and 5', 5", 5''' by concave perforated separators 24, 34 and 25, 35 which are mounted inside these elements. The specific location of separators inside each element 4, 5 is chosen in such a manner that the height of each compartment becomes equal to half the length of the acoustic wave transmitted during pulsation of the stream at a given frequency of pulsation.

The specific geometry of both elements 4, 5 and division of their interior into communicating compartments 4', 4", 4'" and 5', 5", 5'" in accordance with the above-described relation ensures that these elements in fact function as resonant filters, preventing wasteful dissipation of acoustic waves emitted from the pulsating stream along the X—X axis and therefore improving efficiency of conversion.

A distribution ring 30 is mounted in the lower part of the working chamber 1. This ring is installed in such a manner that a circular space 31 is provided between the conical surface 105 of the lower filter 5 and the ring 30. The purpose of this circular space is to ensure symmetrical direction of the working medium supplied under pressure with respect to the longitudinal axis of the stream. This is favorable for establishing a cylindrical stream which efficiently emits acoustic waves.

In order to ensure stable and efficient pulsation of the stream and thus efficient transfer of acoustic waves emission from the stream towards the transducer, a certain relationship should be satisfied between mechanical properties of the medium and the volume change of the stream during pulsation.

This relationship can be expressed as follows:

$$\delta V \geq V(A-1)/(A+1),$$

where:

A—is the required rate of compression of the gaseous substance in said pulsating stream, V—is a mean volume of said pulsating stream included between the orifice 14 and opening 13, and δV—is the ultimate volume change of the stream which might take place during pulsation without destroying the continuity of this stream.

Figure 2:
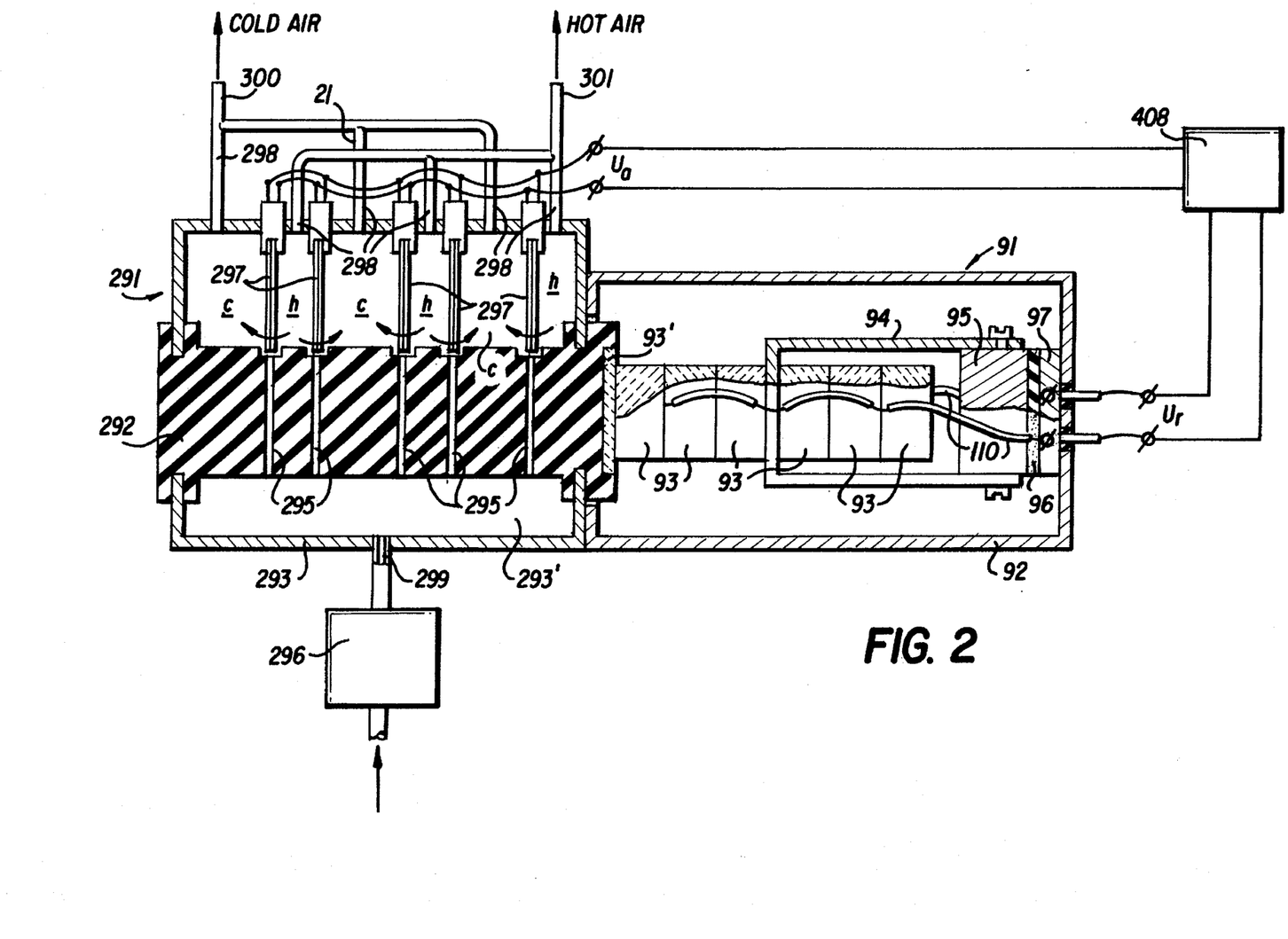
FIG. 2 shows a schematic view of the second embodiment of the electroacoustic energy converter according to the present invention, converting electric energy into heat energy and serving as a heat machine utilizing the compression refrigeration cycle for producing cold.

The working medium, mechanical properties of which satisfy the above relationship, may consist of a fluid substance as described above or a pseudofluid substance as will be shown further in connection with reference to FIG. 2 of another embodiment of the present invention.

Figure 3:
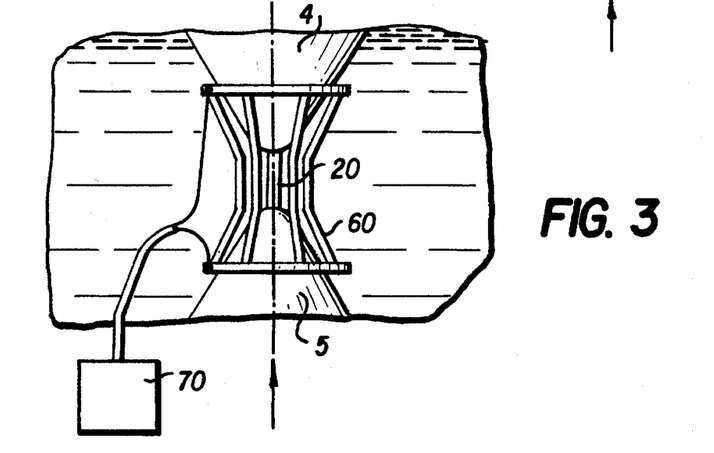
FIG. 3 is an enlarged fragment of the embodiment shown on FIG. 1.

Additional improvement of the embodiment presented in FIG. 1 will now be described with reference to FIG. 3. This figure illustrates an enlarged fragment of FIG. 1 with two oppositely disposed apexes of the lower and upper acoustic filters 4, 5 and the stream 20 pulsating between them, emitting acoustic waves into the working medium.

The influence of the electromagnetic field induced via the cage 60 installed around the stream and mounted on the apexes is used to control the shape and stability of the stream. The cage is electrically connected with the outside source of the electromagnetic field, i.e., the source of current 70. The influence of electromagnetic field is ensured by coupling the electrical charge to the working medium and/or the gaseous substance. The charge can be coupled by incorporating electrostatically charged particles; separate charging devices 75, 85 are provided which are installed, respectively, in the lines of supply of the working medium and the gaseous substance.

The electroacoustic energy converter according to the above-described embodiment can also be provided with a common control unit 90 for simultaneous control of the means 18, 19 and charging devices 75, 85. It is not shown specifically, but should be clear for the person having ordinary skill in the art that the same unit can be connected with the unit 8 for simultaneous control of the ignition voltage.

The second embodiment of the present invention with reference to FIG. 2 will now be described.

According to this embodiment the electroacoustic converter functions in opposite direction in the sense that it converts the supplied outside electrical energy into acoustical waves which are emitted by the transducer and transferred through the working medium to the stream.

These waves cause periodic compression and expansion of the gaseous substance in the stream, accompanied by its adiabatic heating and cooling. In other words, the electrical energy supplied to the converter is transferred into heat energy and the acoustical converter in fact operates as a heat machine.

As can be seen from FIG. 2, the electroacoustic converter of energy according to this embodiment is provided by the transducer 91, which is installed outside of the working chamber 291.

The particular construction of the piezoelectric transducer used in this embodiment is known in the art and may be carried out, for example, as a housing 92 in which piezo-elements 93 are installed. These elements are glued together in a stack and fixed by the cramp 94 to the basement 95. Element 93' of the stack is acoustically connected to the working chamber.

The transducer is provided with an electrical terminal 97 mounted on the housing 92 and electrically connected with piezoelectric elements 93. The basement 95 of the transducer is connected to the terminal via the elastic plate 96. Electrical energy is supplied from the outside source 108 of alternating voltage U1 to the electrical terminal 97 and then via electrical contacts 110 to the piezoelements 93 of the transducer.

When the frequency of supplied voltage corresponds to the resonant frequency of the transducer, most efficient conversion of electrical energy into acoustic waves takes place, and they are emitted from the transducer towards the working chamber.

As in the previous embodiment shown with reference to FIG. 1, the working chamber 291 is provided with a lower cover 293 and an upper cover 294 and is filled with the working medium.

However, unlike the previous embodiment, this medium is not a fluid substance, but a pseudofluid substance. The term "pseudofluid" should be understood here in the sense that the physical state of this substance still allows it to conform to the outline of its container, but without the ability to flow. Therefore, there is a possibility that it may take a particular form or shape.

One example of such a pseudofluid substance is silicone rubber. The working medium is shaped as a rubber plate 292 installed between the lower cover 293 and the upper cover 294 of the working chamber, thus dividing it into lower 293' and upper 294' compartments. These compartments communicate through the plurality of the thin channels 295 provided in the plate 292. Specific location of the plate 292 inside the chamber is chosen in such a manner that acoustical contact between the plate and transducer is provided, thus ensuring the propagation of acoustical waves through the working medium.

The chamber is connected with the outside source 296 of the gaseous substance, supplied under pressure into the lower compartment '293 via the inlet nozzle 299 and then passing via channels 295. As an example of the gaseous substance used in this embodiment, one can mention air.

Propagation of acoustical waves through the working medium causes periodic expansion and contraction of the channels, periodic compression and expansion of air in these channels, and therefore its periodic adiabatic heating and cooling. In other words, according to this embodiment, the converter serves as a heat machine functioning in the compression-refrigeration mode.

As a result, the pulsating stream of cold or hot air which is established passes channels 295 towards the upper compartment 294. In order to ensure the most efficient conversion of acoustical energy into heat energy the particular dimensions of the channels should satisfy the condition of establishing pulsation with the resonance frequency.

The upper compartment is provided with a plurality of valves 297 mounted opposite each channel. These valves are elongated flexible plates which divide the upper compartment into a plurality of adjacent sections c, h dedicated to hot or cold air. Each section is provided with its own outlet nozzle 298. The outlet nozzles of all sections dedicated for cold air are connected with a common duct 300 and the outlet nozzles of all sections dedicated to hot air are connected with a common duct 301.

The functioning of valves 297 will now be explained in more detail with reference to FIG. 4 which shows an enlarged fragment of one such valve. The valve 297 is an elongated flexible plate firmly fixed by one of its ends 297' to the upper cover 294. The second end 297" is left free and almost touches the exit of the channel 295. Due to the elasticity of the plate, this end is able to move left or right with respect to the exit and thus to guide the stream of air coming out of the channel to the cold or hot section of the upper compartment. In other words, this plate may function as a reciprocating flap valve.

One such reciprocating flap which can be used, for example, is a device known as a bimorph plate.

The bimorph plate as known in the art consists of two thin plates made of piezoelectric ceramic, stuck back-to-back, so that their poling directions are opposed. If voltage is applied to these plates, one of them will contract in the poling direction and correspondingly expand in the lateral direction. The effect on the second plate will be the opposite because its poling direction is reversed. Finally, repetitively applying voltage to the bimorph plate will cause it to flex repetitively.

The bimorph plate used in the present invention is connected with the outside source 108 of alternating voltage, U2. When the alternating voltage U2 is applied to the fixed end 297', the plate 297 periodically flexes causing reciprocation by its free end 297" as described above, and thus allowing the passing of cold or hot air to the appropriate section, c or h, of the upper compartment.

The frequency of voltage U1 supplied to the transducer is in agreement with the frequency of voltage U2 supplied to the bimorph plates 297. This means that the frequency of acoustic waves emitted from the transducer 91 to the working medium 292 and thus periodicity of the exit of hot or cold from the channels 295 is in agreement with the position of the bimorph plates 297.

The lower compartment 293', as well as sections c, h of the upper compartment 294' function as acoustic filters which eliminate wasteful dissipation of acoustic energy from the outside channels and thus improve the efficiency of conversion.

Figures 4, 5, 6:
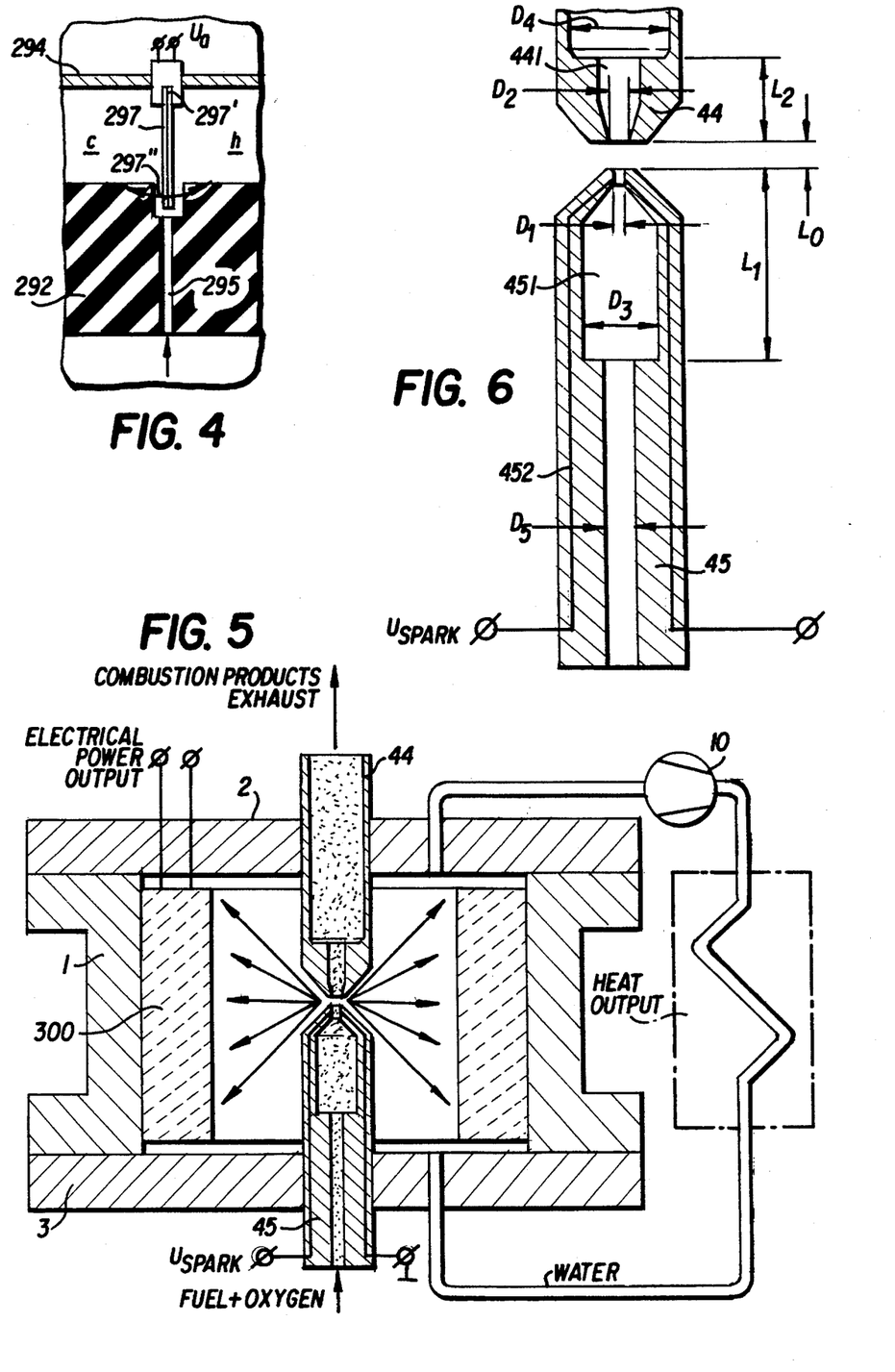
FIG. 4 is an enlarged fragment of the embodiment shown on FIG. 2.
FIG. 5 is a schematic view of an electroacoustic energy converter in accordance with a third embodiment of the present invention, which serves as a generator of electrical energy piezoelectrically converted from heat energy, using water as the working medium, or a gas mixture of oxygen with a combustible gas.
FIG. 6 is an enlarged view of a filter means, employed in the embodiment shown in FIG. 5.

In FIGS. 5 and 6, there is shown an electroacoustic energy converter for transformation of thermal energy into electric energy in which, unlike the embodiment shown in FIG. 1, the working medium is water instead of gasoline and instead of air and oxygen, a gaseous mixture of oxygen with combustible gas is blown through. In general this embodiment is similar to the previous one, however, instead of funnel-like acoustic filters, narrow acoustic filter means 44, 45 with specific configuration, are employed here, as will be explained further.

With reference to FIG. 6, both the upper filter means 44 as well as the lower one 45 are formed with internal chambers 441, 451 having diameters D4 and D3. Particular values for these diameters are to be chosen so as not to exceed value Do=1,22 C/f, where: f is the generator working frequency and C is the sound velocity in gases. In the lower filter means C is a sound velocity in the oxygen-fuel gas mixture, and in the upper filter means C is a sound velocity in the combustion products which are exhausted therethrough.

By means of the above relation there is allowed filtration of all higher modes of oscillations and there is ensured operation of generator at zero mode only. Internal chambers of filter means communicate with the outside space by virtue of corresponding orifices 13, 14 having diameters D2 and D1. Diameter D1 of the orifice 14 controls the diameter of a gas jet passing through the water and consequently the resonant frequency of gas bubbles pulsating in the gap Lo between the lower and upper filter means. Diameter D2 of the orifice 13 is somewhat bigger than D1 so as to accommodate widening of the jet stream emerging from orifice 14. At the distance L1 from the uppermost end of lower filter means 45, the inside diameter D3 of chamber 451 decreases stepwardly to D5, so as to form a half-wave resonator. At distance L2 from the lowermost end of the upper filter means 44, diameter D2 of chamber 441 stepwardly increases up to D4 so as to form a quarter-wave resonator. The gap Lo between lower filter 45 and upper filter 44 is somewhat greater than a jet diameter and is to be chosen empirically upon the condition of ensuring stability of the jet pulsating therebetween.

The body of the lower filter means is made of insulating material and is provided with built-in electrodes 452 extending therealong up to the orifice 14. Here, electrical discharges are launched at frequency f.

It can be appreciated that the upper and lower filter means constitute in combination a couple, functioning as emitter of acoustic waves, emitted by virtue of a pulsating stream emerging from the lower filter means 45 towards the upper filter means 44. In the experimental unit built in accordance with the embodiment shown in FIGS. 5 and 6, piezotransducer ITC-2044 was used with an 8 to 16 kHz frequency range and with outlet power 300 W at 0.5 COP. Physical dimensions of the transducer were 3.75" OD, and 1.8" H.

This transducer was developed by ITC Corp. for other purposes and has relatively wide resonance. It is advantageous if the piezotransducer structure has sharp resonance and COP value not less than 0.8.

In practice COP values more than 0.9 at about 20 kW/kg capacity can be achieved with commercially available piezoceramics, for example with that manufactured by Morgan Co.

In the experimental unit, the external surface of a piezotransducer was enclosed within a perforated rubber screen.

The particular dimensions of upper and lower filter means were chosen as follows:

D1=0.2 mm, D2=0.4 mm, D3=3 mm, D4=3 mm, D5=1 mm, L1=16 mm, L2 =10 mm, and Lo=0.9 mm.

The gas mixture fed within the experimental unit was a mixture of oxygen with propane, taken in the following relation: oxygen—5 mole, and propane—1 mole. The spark generator produces a voltage Uspark about 2 kV.

The unit working chamber and all elements residing within the unit were designed so as to withstand pressure up to 100 atm, but at the present stage all experiments were carried out at 1 atm pressure.

On the experimental unit it was possible to establish pulsating combustion of gases with a fluid. This pulsating combustion was stable and the output, released from the transducer was about 1 watt.

It should be realized that achievable power yield produced by the above embodiment can be increased by virtue of increase of working pressure Po and if the amount of emitters, here constituted by a pair of lower and upper filter means is increased from 1 to N. The outlet power W will be then proportional to about $PoN^2$. Increase of pressure is proportional to the quantity of thermal energy released by a single bubble. A sinphase operation of N coupled emitters will result in $N^2$ times increase of total power released. Thus the generator structure suitable to produce practically acceptable energy output and employing all energetic capabilities of commercially available piezoceramics (about 20 W/kg) must be provided with an increased number of emitter couples where synchronization of oscillations is provided for. In structures now under development the pressure Po may be raised up to 100–200 atm.

Since the resonant frequency of a bubble pulsating in a gas is proportional to about $\sqrt{Po}$, an increase of obtainable power is possible with piezotransducers of higher frequency. Up to frequencies f of about 50 kHz, it is advantageous if the transducer is formed with a ring shape as will be explained further with reference to FIGS. 7a and 7b. At frequencies higher than 50 kHz, a piezotransducer formed as plurality of piezoceramic plates may be used.

Figure 7A:
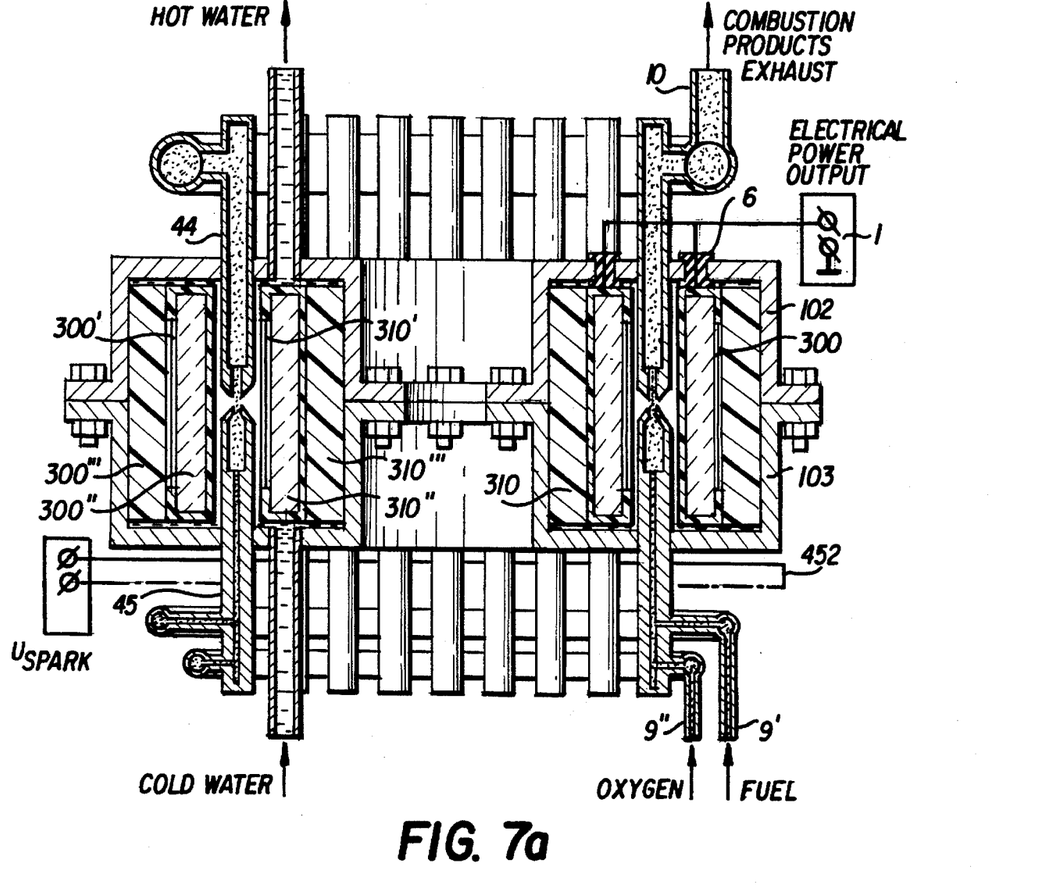
FIG. 7a is a schematic view of an electroacoustic energy converter in accordance with a fourth embodiment of the present invention, which serves as a generator of electrical energy piezoelectrically converted from heat energy, using first and second coaxially disposed piezotransducers.
Figure 7B:
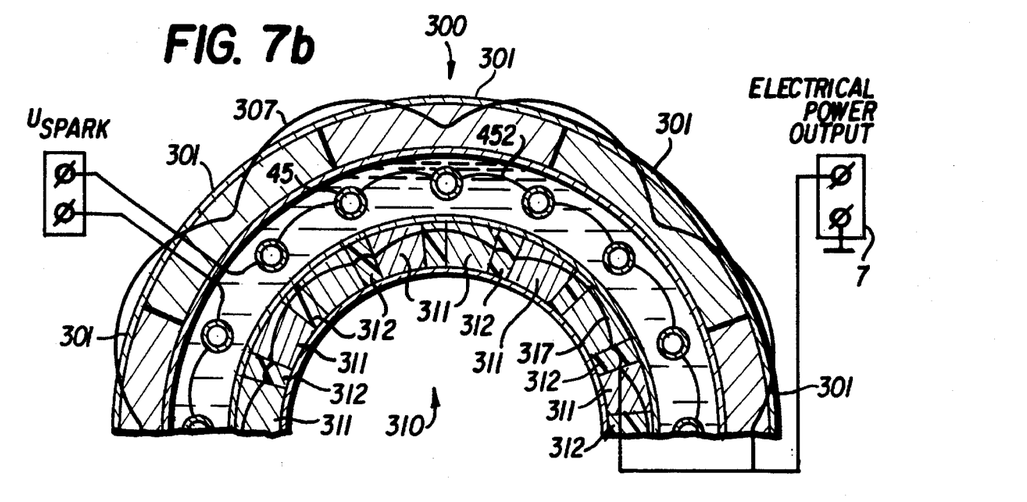

In FIGS. 7a and 7b an example of an assembly designed to release a power output of about 500 W is shown. The blown-through gaseous mixture of oxygen with combustible gases or with hydrogen is fed, respectively, through inlet nozzles 9' and 9''. The working medium is water. The static pressure Po is about 20 atm, and the working frequency f is 25 kHz. Two piezotransducers shaped as rings 300 and 310 are mounted co-axially, one inside the other. The piezotransducers each consist of plurality of segments 301, 311 made of piezoceramic such as PZT-4. These segments are connected electrically in parallel by virtue of conductors 307 and 317. Adjacent segments of inside piezotransducer ring 310 are spaced apart by perforated inserts 312, made of acoustically passive material.

This provision allows one to reduce resonant frequency f of the inside piezotransducer ring 310 and to make it equal to that of the outside transducer ring 300. To improve mechanical strength, which may be needed for producing higher power outputs, fiberglass reinforcement elements 300' and 310' are provided. Both piezotransducer rings are sealed within insulating sleeve shells 300'' and 310''. The external cylindrical surface of the outside ring 300 and the internal surface of the inner ring 310 are provided with acoustic screens 300''' and 310''' made of a perforated polymer.

The average diameter of the outside ring 300 is ~40 mm, and the distance between the internal surface of outside ring 300 and the outward surface of inside ring 310 is about 8 min. Both rings reside within a rigid structure formed as bolted toroidal lids 102 and 103. Within a room between upper and lower lids there are arranged N=16 emitter couples similar to that shown in FIG. 6. Dimensions L1 and L2 (as in FIG. 6) are reversibly proportional to related resonance frequencies. Igniting electrodes 452 are provided within the lower filter means of each couple so as to supply an alternating voltage Uspark to all 16 orifices and to discharge simultaneously, thus providing for synchronized pulsation of a plurality of gas jets in water. Mechanical pressure raises 16 times and achievable power output raises 256 times as compared to the power output released by a single emitter couple. An electric power output is released from common terminal 7.

Although certain presently preferred embodiments of the invention have been described herein, it will be apparent to those skilled in the art to which the invention pertains that variations and modifications of the described embodiment may be made without departing from the spirit and scope of the invention. Accordingly, it is intended that the invention be limited only to the extent required by the appended claims and the applicable rules of law.

I claim:

1. Electroacoustic energy converter for transformation between thermal and electrical comprising:
   i) an assembly providing a working chamber filled with a working medium;
   ii) at least one electroacoustic transducer provided with an electric terminal, wherein said transducer, upon being exposed to electric voltage applied to said terminal, emits acoustic waves transmitted to said working chamber and, upon being exposed to acoustic waves transmitted from said working chamber, converts them into electrical energy to be released as an electrical signal from the electric terminal;
   iii) at least one pair of oppositely disposed acoustical filters communicating with said working chamber, wherein a first filter is provided with an inlet nozzle and a second filter is provided with an outlet nozzle;
   iv) a source of a gaseous substance, said substance to be supplied under pressure within said assembly so as to initiate a stream of said substance directed from said first filter toward said second filter, wherein said stream pulsates to form a pulsating stream while emitting acoustic waves and transmitting acoustic waves to said transducer via said working medium and pulsates to form a pulsating stream subject to acoustic waves transmitted from said transducer to said stream,
   wherein said transducer is acoustically connected with said working medium consisting of a substance with mechanical properties satisfying the following relationship:

$$\delta V \geq V(A-1)/(A+1),$$

where
   A is the required rate of compression of the gaseous substance in said pulsating stream,
   V is a mean volume of said pulsating stream, included between said filters, and
   $\delta V$ is the ultimate volume change of said pulsating stream without destruction of its continuity.

2. Electroacoustic energy converter as claimed in claim 1, wherein at least one of said filters is electrically connected with the source of voltage.

3. Electroacoustic energy converter as claimed in claim 1, wherein said working medium comprises a fluid substance selected from the group of substances consisting of liquid substances and gelatinous substances, and wherein said assembly is provided with an outside source of said fluid substance to be supplied under pressure into said working chamber.

4. Electroacoustic energy converter as claimed in claim 3, wherein said fluid substance is mainly jelly gasoline.

5. Electroacoustic energy converter as claimed in claim 1, wherein said gaseous substance mainly comprises a mixture of gasoline vapor with air.

6. Electroacoustic energy converter as claimed in claim 1, wherein said transducer is a ring in which the inner surface provides a cylindrical space for said working chamber, said filters are funnel-like elements having apexes which are disposed along a longitudinal axis of said working chamber, an apex of the first filter is provided with a calibrated orifice adapted to pass a fluid substance supplied to said working chamber for creating said pulsating stream, an apex of one of said filters is a conical tip electrically insulated from the rest of said one of said filters and said conical tip is electrically connected with said source of voltage, and an apex of the second filter is provided with an opening communicating with said working chamber and adapted to intake said pulsating stream.

7. Electroacoustic energy converter as claimed in claim 3, wherein said converter is provided with means for maintaining and controlling the pressure of said fluid substance to be supplied into said working chamber.

8. Electroacoustic energy converter as claimed in claim 1, further comprising at least one source of electromagnetic field electrically connected with said pulsating stream.

9. Electroacoustic energy converter as claimed in claim 8, wherein said source of electromagnetic field is the source of current.

10. Electroacoustic energy converter as claimed in claim 8, wherein said working medium and said gaseous substance contain particles selected from the group of particles consisting of electrostatically charged particles and magnetic particles.

11. Electroacoustic energy converter as claimed in claim 1, wherein said acoustic filters are hollow elements provided with at least one perforated plate installed inside an interior thereof and dividing each said filter into communicating compartments adapted to filter and eliminate wasteful dissipation of acoustic waves transmitted via said pulsating stream.

12. Electroacoustic energy converter as claimed in claim 1, wherein said assembly is provided with distribution means installed inside said working chamber for directing said working medium supplied into said working chamber symmetrically with respect to a longitudinal axis of said working chamber.

13. Electroacoustic energy converter as claimed in claim 12, wherein said distribution means is a ring installed around said first filter so as to provide a circular gap between said ring and the outside conical surface of said first filter.

14. Electroacoustic energy converter as claimed in claim 1, wherein said working medium comprises a fluid substance provided with at least one channel for the passing of said pulsating stream from said first filter to said second filter, and wherein said acoustic waves emitted from said transducer cause periodical compression and expansion of said stream passing via said channel and thus cause the periodical adiabatic heating and cooling thereof, and wherein said second filter is provided with at least one additional outlet nozzle and with at least one valve adapted to allow periodical passage of said heated or cooled stream, respectively, via one of said outlet nozzles.

15. Electroacoustic energy converter as claimed in claim 14, wherein said valve for periodical passage of said heated or cooled stream is a flexible flap fixed inside said second filter.

16. Electroacoustic energy converter as claimed in claim 14, wherein said valve for periodical passage of said heated or cooled stream is a piezoelectric biomorph-type plate, and said converter is provided with an outside source of alternating voltage electrically connected with said plate.

17. Electroacoustic energy converter as claimed in claim 3, wherein said fluid substance is mainly water.

18. Electroacoustic energy converter as claimed in claim 1, wherein which said gaseous substance mainly comprises of combustible gas mixed with oxygen.

19. Electroacoustic energy converter as claimed in claim 1, wherein said gaseous substance mainly comprises of hydrogen mixed with oxygen.

20. Electroacoustic energy converter as claimed in claim 1, wherein said transducer comprises a ring having an inner surface which provides a cylindrical space for said working medium, and wherein said filters are narrow chambers having apexes disposed along a longitudinal axis of said working chamber, an apex of one of said filters being conical tip electrically connected with said source of voltage, and the an apex of another of said filters being provided with an opening communicating with said working chamber and adapted to intake said pulsating stream, and the apex of said one filters being provided with an opening adapted to pass the gaseous substance for creating said pulsating stream.

21. Electroacoustic energy converter as claimed in claim 1, wherein said transducer comprises a first ring and a second ring coaxially disposed inside said first ring wherein the second ring includes an inner surface which provides a cylindrical space for said working chamber, and wherein said filters are disposed within said cylindrical space.

\* \* \* \* \*